United States Patent
Uehara

(10) Patent No.: US 6,797,659 B2
(45) Date of Patent: Sep. 28, 2004

(54) OPTICAL GLASS

(75) Inventor: Susumu Uehara, Sagamihara (JP)

(73) Assignee: Kabushiki Kaisha Ohara, Kanagawa-ken (JP)

( * ) Notice: Subject to any disclaimer, the term of this patent is extended or adjusted under 35 U.S.C. 154(b) by 0 days.

(21) Appl. No.: 10/159,471

(22) Filed: May 31, 2002

(65) Prior Publication Data

US 2003/0022782 A1 Jan. 30, 2003

(30) Foreign Application Priority Data

Jun. 6, 2001 (JP) ........................ 2001-170457

(51) Int. Cl.$^7$ .................. C03C 3/068; C03C 3/155
(52) U.S. Cl. ................. 501/78; 51/79; 51/37; 51/51
(58) Field of Search ............... 501/37, 51, 78, 501/49, 50, 77, 79

(56) References Cited

U.S. PATENT DOCUMENTS 4,732,875 A * 3/1988 Sagara .................. 501/42

FOREIGN PATENT DOCUMENTS

| DE | 2257635 A | * | 6/1973 | ........... C03C/3/14 |
| DE | 3130715 A1 | * | 2/1982 | ........... C03C/3/30 |
| DE | 199 19 304 A | * | 11/1999 | |
| JP | 49021408 A | * | 2/1974 | |
| JP | 60221338 A | * | 11/1985 | ........... C03C/3/068 |
| JP | 61163138 A | * | 7/1986 | ........... C03C/3/068 |
| JP | 62100449 A | * | 5/1987 | ........... C03C/3/064 |
| JP | 08026765 A | * | 1/1996 | ........... C03C/3/068 |
| JP | 08026766 A | * | 1/1996 | ........... C03C/3/068 |
| JP | 2001220169 A | * | 8/2001 | ........... C03C/3/068 |

OTHER PUBLICATIONS

English Translation of JP 60–221338.*
Derwent Abstract 1982–16006E, Abstract for DE 3130715 A.*
Derwent Abstract 1985–319327, Abstract for JP 60–221338 A.*
Derwent Abstract 1986–234732, Abstract for JP 61–163138 A.*
Derwent Abstract 1987–167506, Abstract for JP 62–100449 A.*

* cited by examiner

Primary Examiner—Karl Group
Assistant Examiner—Elizabeth A. Bolden
(74) Attorney, Agent, or Firm—Hedman & Costigan, P.C.

(57) ABSTRACT

There is provided an optical glass suitable for precision mold pressing having optical constants of a refractive index ($n_d$) within a range from 1.75 to 1.85 and an Abbe number ($v_d$) within a range from 35 to 45, comprising in mass % on oxide basis:

| $SiO_2 + B_2O_3$ | 16.5–less than 30% |
| in which $SiO_2$ | 1–7.5% |
| $B_2O_3$ | 15.5–25% |
| $La_2O_3$ | 25–40% |
| $ZrO_2$ | 1.5–10% |
| $Nb_2O_5$ | 1–15% |
| $Ta_2O_5$ | 1–10% |
| $WO_3$ | 1–10% |
| ZnO | 15.5–30% |
| $Li_2O$ | 0.6–5%. | having a transition point (Tg) within a range from 500° C. to 590° C. and a yield point (At) within a range from 530° C. to 630° C., and being free from devitrification in a devitrification test conducted under a condition of 950° C./2 hours.

8 Claims, No Drawings

OPTICAL GLASS

BACKGROUND OF THE INVENTION

This invention relates to an optical glass and, more particularly, to an optical glass which has optical constants of a refractive index ($n_d$) within a range from 1.75 to 1.85 and an Abbe number ($v_d$) within a range from 35 to 45 and is suitable for precision mold press forming.

In recent remarkable development of more compact and light-weight optical instruments, more aspherical lenses tend to be used for the purpose of reducing the number of lenses constituting an optical system of an optical instrument. For manufacturing an aspherical lens, the main current of the industry is to heat and thereby soften a preform obtained from a glass gob or glass block and press the softened preform with a mold having a high precision surface for transferring its mold surface to the preform. An aspherical lens obtained by this method can be processed to a product of a desired shape at a high productivity without grinding and polishing, or with minimum grinding and polishing. In the field of precision mold press forming of glass, various glass products including optical elements such as spherical and aspherical lenses and diffraction grating are now manufactured by the precision mold press forming.

There are generally two methods for manufacturing the preform. One is a dropping method according to which, as described, e.g., in Japanese Patent Application Laid-open Publication No. Hei 6-122526, melted glass is dropped from a tip of a flow tube, received and molded by a mold and then is cooled to provide a glass preform. According to this method, a preform is directly obtained while the glass is hot and, therefore, a preform can be manufactured at a high productivity in a large scale production. Besides, since a glass preform thus obtained has a lens shape which is either spherical or convex in both surfaces, an amount of change in the shape during the precision mold press forming can be held at the minimum.

The other method is to obtain a preform by cutting a glass block. This method has the problem that it requires increased steps of processing from cutting of a glass block to a step of processing to a shape which is close to a final lens shape but, since processing to a lens shape dose to a final lens shape is conducted, an amount of change in the shape can be reduced in forming various shapes of lenses besides a lens shape which is convex in both surfaces and, as a result, pressure of a press required for mold pressing can be reduced.

In producing a glass product by precision mold pressing, it is necessary to heat and press a glass preform under a high temperature for transferring a high precision mold surface to the glass product. For this reason, a mold used for this purpose is subjected to high temperature and pressure and, as a result, the surface of the mold tends to be oxidized and corroded in softening the preform by heating. This makes it difficult to maintain a high precision surface of the mold and, therefore, the number of times of replacing the mold increases and, therefore, a large scale production of the glass product at a low cost becomes difficult. For this reason, in an optical glass which constitutes a glass preform, for the purpose of preventing damage to a mold and also to a mold releasing film provided on the inner surface of the mold which takes place due to the high temperature environment in mold pressing, it is desired to reduce transition point (Tg) and yield point (At) at the lowest possible levels.

Glasses having various optical constants are sought as glass used for aspherical lenses. Among them, there is a strong demand for glass having a high refractive index ($n_d$) within a range from 1.75 to 1.85 and an Abbe number ($v_d$) within a range from 35 to 45. A typical glass having such optical constants is a lanthanum borate optical glass. For example, Japanese Patent Application Laid-open Publication No. Sho 60-221338 discloses a lanthanum borate optical glass having a low transition point. Such glass has a low transition point (Tg) and a low yield point (At) but, since difference (At–Tg) between the transition point and the yield point is small, difficulty arises in mold pressing for a large scale production of glass products in a stable manner. It is necessary to use glass having a wider range of At–Tg as a preform. Further, in a high refractive index region of n has decreased resistance to devitrification and, for this reason, a preform cannot be produced from this glass by the dropping method.

Japanese Patent Application Laid-open Publication No. Hei 6-305769 discloses a lanthanum borate optical glass maintaining a low transition point and an excellent chemical durability. This glass, however, is also insufficient for manufacturing a preform by the dropping method in respect of resistance to devitrification.

Various glasses containing PbO have been proposed as glasses having a low transition point (Tg) and a low yield point (At). Since, however, the glasses containing PbO tend to be fused to the mold during mold pressing, it is difficult to use the mold repeatedly and hence they are not suitable as an optical glass for mold pressing. In glass containing $F_2$, the $F_2$ ingredient evaporates from the surface of glass melt and thereby causes cloudiness on the surface of a preform when the preform is produced from the glass melt, or, when the preform is molded by mold pressing, the $F_2$ ingredient evaporates and is deposited on the surface of the mold to cause cloudiness on the surface of the mold. For these reasons, the glass containing $F_2$ is not suitable as an optical glass for mold pressing.

It is, therefore, an object of the present invention to provide an optical glass which has eliminated the above described disadvantages of the prior art optical glasses, has optical constants of a refractive index ($n_d$) within a range from 1.75 to 1.85 and an Abbe number ($v_d$) within a range from 35 to 45, has a low transition point (Tg) and a low yield point (At), has a wide range of At–Tg, has excellent resistance to devitrification, and is suitable for precision mold pressing.

It is another object of the invention to provide an optical glass which has excellent resistance to devitrification and therefore is suitable for manufacturing a preform for precision mold pressing by the dropping method.

SUMMARY OF THE INVENTION

As a result of laborious studies and experiments, the inventor of the present invention has found, which has led to the present invention, that, in glass having optical constants of a refractive index ($n_d$) within a range from 1.75 to 1.85 and an Abbe number ($v_d$) within a range from 35 to 45, a lanthanum borate glass which can prevent oxidation of the surface of a mold having a high precision surface for mold pressing can be obtained and that only within a composition of extremely limited range can be found an optical glass which has the above described desired optical constants and suitable Tg, At and At–Tg, has excellent resistance to devitrification, is free from substance which is undesirable for protection of the environment and has excellent precision mold pressing characteristics.

For achieving the above described objects of the invention, there is provided an optical glass having optical constants of a refractive index ($n_d$) within a range from 1.75 to 1.85 and an Abbe number ($v_d$) within a range from 35 to 45, comprising in mass % on oxide basis:

| | |
|---|---|
| $SiO_2 + B_2O_3$ | 16.5–less than 30% |
| in which $SiO_2$ | 1–7.5% |
| $B_2O_3$ | 15.5–25% |
| $La_2O_3$ | 25–40% |
| $ZrO_2$ | 1.5–10% |
| $Nb_2O_5$ | 1–15% |
| $Ta_2O_5$ | 1–10% |
| $WO_3$ | 1–10% |
| ZnO | 15.5–30% |
| $Li_2O$ | 0.6–5%. | having a transition point (Tg) within a range from 500° C. to 590° C. and a yield point (At) within a range from 530° C. to 630° C., and being free from devitrification in a devitrification test conducted under a condition of 950° C./2 hours.

In one aspect of the invention, there is provided an optical glass having optical constants of a refractive index ($n_d$) within a range from 1.75 to 1.85 and an Abbe number ($v_d$) within a range from 35 to 45 and comprising in mass % on oxide basis:

| | |
|---|---|
| $SiO_2 + B_2O_3$ | 16.5–29.5% |
| in which $SiO_2$ | 1–less than 6% |
| $B_2O_3$ | 15.5–25% |
| $La_2O_3$ | 25–40% |
| $Y_2O_3$ | 0–less than 0.1% |
| $ZrO_2$ | 2–6.5% |
| $Nb_2O_5$ | 3–12% |
| $Ta_2O_5$ | 1–8% |
| $WO_3$ | more than 5%–10% |
| ZnO | 17–28% |
| $Li_2O$ | 0.6–3% |
| $GeO_2$ | 0–5% |
| $TiO_2$ | 0–5% |
| $Al_2O_3$ | 0–1% |
| BaO | 0–1% |
| $Yb_2O_3$ | 0–1% |
| $Sb_2O_3$ | 0–1%. |

The optical glass may have a transition point (Tg) within a range from 500° C. to 590° C. and a yield point (At) within a range from 530° C. to 630° C., and may be free from devitrification in a devitrification test conducted under a condition of 950° C./2 hours.

In another aspect of the invention, difference in temperature At–Tg between the yield point and the transition point is 30–60° C.

DETAILED DESCRIPTION OF THE INVENTION

The optical glass of the invention having optical constants of a refractive index ($n_d$) within a range from 1.75 to 1.85 and an Abbe number ($v_d$) within a range from 35 to 45 has a relatively low transition point (Tg) and a relatively low yield point (At). The optical glass of the present invention has a transition point (Tg) which preferably is 500° C. to 590° C. and a yield point (At) which preferably is 530° C. to 630° C. More preferably, the yield point should be 530° C. to 620° C.

In the optical glass for precision mold pressing of the invention, the greater the difference At–Tg between the transition point (Tg) and the yield point (At), the more stability can be achieved in a large scale production by mold pressing. Therefore, At–Tg should preferably be 30° C. or over and, more preferably be 40° C. or over. If, however, At–Tg is excessively large, it will become difficult to shorten a cycle time during the precision mold pressing and, for this reason, At–Tg should preferably not exceed 60° C. From this standpoint, the transition point (Tg) of the optical glass of the invention should more preferably be 500° C. to 580° C. and most preferably be 500° C. to 570° C. and the yield point (At) should more preferably be 550° C. to 620° C.

The optical glass of the present invention has excellent resistance to devitrification. By virtue of this feature, a preform can be formed directly by the dropping method and thereby it can be manufactured at a low cost. The optical glass of the invention should preferably be free from devitrification in a devitrification test conducted under a condition of 950° C./2 hours and more preferably be free from devitrification in a devitrification test conducted under a condition of 900° C./2 hours.

Reasons for limiting the composition range of respective ingredients of the optical glass of the invention as defined in the claims will now be described. The respective ingredients are described in mass % calculated on oxide basis.

In a $B_2O_3.La_2O_3$ glass, the $SiO_2$ ingredient is effective for increasing viscosity of glass and improving resistance to devitrification and it is necessary to add this ingredient in an amount of 1% or more. For maintaining Tg and At at low levels, the amount of this ingredient should preferably be not more than 7.5% and more preferably be not more than 7% and most preferably be less than 6%. In case $Y_2O_3$ ingredient is included in an amount of less than 0.1%, for setting Tg and At at low levels, the $SiO_2$ ingredient should preferably be contained within a range from 1% to less than 6%, more preferably within a range of 3–5.9% and, most preferably within a range of 3–5.5%.

If the amount of the $B_2O_3$ ingredient is less than 15.5%, resistance to devitrification is not sufficient whereas if the amount of this ingredient exceeds 25%, chemical durability is deteriorated. The amount of this ingredient therefore is limited within a range of 15.5–25%. In the $B_2O_3.La_2O_3$ glass including the optical glass of the present invention, the $B_2O_3$ ingredient functions as a main glass forming oxide.

For satisfying resistance to devitrification and target optical constants, a total amount of $SiO_2$ and $B_2O_3$ should preferably be within a range of 16.5—less than 30%, more preferably be within a range of 16.5–29.5% and most preferably be within a range of 18.5–29.5%.

The $La_2O_3$ ingredient is effective for increasing the refractive index and producing a low dispersion glass and should preferably be contained within a range of 25–40%. If the amount of this ingredient is less than 25%, it becomes difficult to maintain the refractive index of the glass to a desired value whereas if the amount of this ingredient exceeds 40%, resistance to devitrification is deteriorated.

The $Y_2O_3$ ingredient is effective for increasing the refractive index of the glass and producing a low dispersion glass. If, however, the amount of this ingredient exceeds 5%, resistance to devitrification is sharply deteriorated. The amount of the $Y_2O_3$ ingredient should preferably be within a range of 0–5%, more preferably be within a range of 0–3% and most preferably be within a range of 0-less than 0.1%. The optical glass of the invention can have a desired refractive index, low dispersion characteristic, low Tg and At values, sufficient resistance to devitrification and good formability by selecting the respective ingredients properly without containing the $Y_2O_3$ ingredient.

The $ZrO_2$ ingredient is effective for adjusting optical constants and improving resistance to devitrification and chemical durability. If the amount of this ingredient is less than 1.5%, these effects cannot be obtained whereas if the amount of this ingredient exceeds 10%, resistance to devitrification is deterriorated rather than improved and, moreover, values of Tg and At become higher than desired values. The amount of this ingredient should preferably be within a range of 1.5–10% and more preferably be within a range of 2–6.5%.

The $Nb_2O_5$ ingredient is effective for increasing the refractive index and dispersion and improving chemical durability and resistance to devitrification. If the amount of this ingredient is less than 1%, these effects cannot be obtained whereas if the amount of this ingredient exceeds 15%, resistance to devitrification is deteriorated rather than improved. The amount of this ingredient should preferably be within a range of 1–15% and more preferably be within a range of 3–12%.

The $Ta_2O_5$ ingredient is effective for increasing the refractive index and improving chemical durability and resistance to devitrification. If the amount of this ingredient is less than 1%, a significant effect cannot be achieved whereas if the amount of this ingredient exceeds 10%, resistance to devitrification is deteriorated rather than improved. The amount of this ingredient should preferably be within a range of 1–10% and more preferably be within a range of 1–8%.

The $WO_3$ ingredient is effective for adjusting optical constants and improving resistance to devitrification. If the amount of this ingredient is less than 1%, a sufficient effect cannot be achieved whereas if the amount of this ingredient exceeds 10%, resistance to devitrification and transmittance in a short wave region are deteriorated rather than improved. The amount of this ingredient should preferably be within a range of 1–10%, more preferably be within a range of 3.8–10% and, most preferably, it should be more than 5% up to 10%. In case the $Y_2O_3$ ingredient is less than 0.1%, the amount of the $WO_3$ ingredient should preferably be more than 5% up to 10% for adjusting optical constants to desired values, maintaining low Tg and At values and improving resistance to devitrification.

The ZnO ingredient is necessary for achieving low Tg and At values. If the amount of this ingredient is less than 15.5%, this effect cannot be achieved sufficiently whereas if the amount of this ingredient exceeds 30%, resistance to devitrification and chemical durability are deteriorated. The amount of this ingredient should preferably be within a range of 15.5–30% and more preferably be within a range of 17–28%.

The $Li_2O$ ingredient is effective for lowering Tg and At and for accelerating melting of $SiO_2$ and other ingredients in melting mixed materials. If the amount of this ingredient is less than 0.6%, this effect cannot be achieved whereas if it exceeds 5%, resistance to devitrification is sharply deteriorated. The amount of this ingredient should preferably be within a range of 0.6–5% and more preferably be within a range of 0.6–3%.

The $GeO_2$ ingredient is, like $B_2O_3$ and $SiO_2$, a glass forming oxide which imparts a higher refractive index to the glass than $B_2O_3$ and $SiO_2$ and can be added also for improving resistance to devitrification of the glass. Since, however, the material is so expensive that the amount of this ingredient should preferably be not more than 5% and more preferably not more than 3%.

The $TiO_2$ ingredient is effective for improving the refractive index and dispersion of the glass. If the amount of this ingredient exceeds 5%, resistance to devitrification is sharply deteriorated. The amount of this ingredient should preferably be within a range of 0–5% and more preferably within a range of 0–3%.

The $Sb_2O_3$ ingredient may be added for defoaming of glass during melting thereof. It will suffice if this ingredient up to 1% is added.

The $Al_2O_3$ ingredient in some cases is effective for improving chemical durability. For maintaining low Tg and At values and sufficient resistance to devitrification, the amount of this ingredient should preferably be not more than 1% and more preferably should not be substantially added.

The BaO, SrO, CaO and MgO ingredients are in some cases effective for improving homogeneity of the glass. For maintaining sufficient resistance to devitrification, the amount of each of these ingredients should preferably be not more than 1% and more preferably should not be substantially added.

Since glass containing PbO ingredient tends to be fused to the mold in mold pressing, the PbO ingredient should preferably be not included substantially for enabling repeated use of the mold and also for protection of the environment.

The $Yb_2O_3$ ingredient is effective for increasing the refractive index and producing a low dispersion glass. For maintaining low Tg and At values and sufficient resistance to devitrification, the amount of this ingredient should preferably be not more than 1% and more preferably should not be substantially added.

EXAMPLES

Examples of the present invention will now be described. It should be noted that the present invention is not limited to these examples.

Tables 1–4 show compositions of examples (No. 1 to No. 26) of the optical glass for precision mold pressing and comparative examples (A to E) together with refractive index ($n_d$), Abbe number ($v_d$), transition point (Tg), yield point (At) and temperature difference (At–Tg) between the yield point and the transition point of these examples and comparative examples.

The optical glasses for mold pressing of Examples No 1 to No. 26 and the Comparative Examples A to E were easily manufactured by weighing and mixing conventional optical glass materials such as oxides, carbonates and nitrates at a predetermined ratio so that compositions described in the tables could be obtained, putting the mixed materials into a platinum crucible, melting the materials at a temperature of 1000° C. to 1300° C. for two to five hours depending upon melting characteristic of each composition, stirring and thereby homogenizing the melt, lowering the temperature to a proper temperature, casting the melt in a mold and then cooling the melt.

Tables 1 and 2 show also results of a devitrification test. In the devitirification test, each specimen of 50 cc was put in a platinum crucible and heated at 1200° C. for one hour to produce a complete liquid melt having no devitrification. Then the melt was held for two hours at a temperature within a range from 1000° C. to 850° C. and then was taken out of the furnace for observation of the state of devitrification by the eye. Specimens in which devitrification was not observed are indicated by the mark ○, specimens in which devitrification was observed only on the surface are indicated by the mark Δ and specimens in which devitrification was observed both on the surface and in the inside are indicated by the mark X.

The transition point Tg and the yield point At were taken from a thermal expansion curve obtained by heating specimens having a length of 50 mm and a diameter of 4 mm to raise the temperature of the specimens at a constant rate of 4° C. per minute and measuring stretch and temperature of the specimens.

TABLE 1

| Composition | Example | | | | | | | | |
|---|---|---|---|---|---|---|---|---|---|
| (mass %) | 1 | 2 | 3 | 4 | 5 | 6 | 7 | 8 | 9 |
| $SiO_2$ | 4.1 | 3.0 | 1.0 | 4.0 | 3.2 | 5.9 | 3.0 | 6.5 | 6.0 |
| $B_2O_3$ | 19.6 | 18.5 | 15.5 | 19.4 | 15.5 | 19.8 | 20.0 | 22.0 | 19.7 |
| $La_2O_3$ | 33.1 | 35.0 | 25.0 | 33.8 | 40.0 | 33.8 | 30.0 | 25.0 | 33.8 |
| $TiO_2$ | | | | | | | | | |
| $ZrO_2$ | 3.7 | 3.9 | 9.5 | 3.7 | 1.5 | 3.7 | 10.0 | 3.0 | 3.7 |
| $Nb_2O_5$ | 4.3 | 5.0 | 10.2 | 5.0 | 1.0 | 6.0 | 5.0 | 8.0 | 6.0 |
| $Ta_2O_5$ | 2.6 | 3.0 | 1.0 | 6.5 | 8.0 | 4.0 | 7.0 | 10.0 | 4.0 |
| $WO_3$ | 6.4 | 1.0 | 10.0 | 3.9 | 5.2 | 7.2 | 6.0 | 5.0 | 7.2 |
| $ZnO$ | 25.1 | 30.0 | 25.0 | 19.5 | 18.0 | 18.5 | 17.0 | 15.5 | 18.5 |
| $Li_2O$ | 1.0 | 0.6 | 1.8 | 2.0 | 2.0 | 1.0 | 2.0 | 4.0 | 1.0 |
| $GeO_2$ | | | | 2.0 | 5.0 | | | | |
| $Sb_2O_3$ | 0.1 | | 1.0 | 0.2 | 0.6 | 0.1 | | 1.0 | 0.1 |
| Total | 100 | 100 | 100 | 100 | 100 | 100 | 100 | 100 | 100 |
| $SiO_2 + B_2O_3$ | 23.7 | 21.5 | 16.5 | 23.4 | 18.7 | 25.7 | 23.0 | 28.5 | 25.7 |
| $n_d$ | 1.806 | 1.815 | 1.846 | 1.805 | 1.816 | 1.905 | 1.816 | 1.782 | 1.805 |
| $v_d$ | 40.9 | 41.3 | 35.1 | 40.9 | 42.1 | 40.3 | 39.2 | 39.6 | 40.3 |
| Tg (° C.) | 539 | 528 | 502 | 527 | 515 | 561 | 549 | 500 | 561 |
| At (° C.) | 583 | 578 | 552 | 569 | 564 | 600 | 587 | 531 | 602 |
| At—Tg (° C.) | 44 | 50 | 50 | 42 | 49 | 39 | 38 | 31 | 41 |
| Result of devitrification test | | | | | | | | | |
| 1000° C. | ○ | ○ | ○ | ○ | ○ | ○ | ○ | ○ | ○ |
| 950° C. | ○ | ○ | ○ | ○ | ○ | ○ | ○ | ○ | ○ |
| 900° C. | Δ | Δ | ○ | ○ | Δ | ○ | Δ | ○ | ○ |
| 850° C. | X | X | X | X | X | X | X | X | X |

TABLE 2

| Composition | Example | | | Comparative Example | | | | |
|---|---|---|---|---|---|---|---|---|
| (mass %) | 10 | 11 | 12 | A | B | C | D | E |
| $SiO_2$ | 6.0 | 5.0 | 5.5 | 8.5 | 3.0 | 5.0 | 7.5 | 7.0 |
| $B_2O_3$ | 23.0 | 23.0 | 21.2 | 20.0 | 20.0 | 20.0 | 18.0 | 20.0 |
| $Y_2O_3$ | | | | 4.0 | 7.0 | 1.0 | | |
| $La_2O_3$ | 25.0 | 27.5 | 27.8 | 30.0 | 20.0 | 33.0 | 36.5 | 35.0 |
| $Yb_2O_3$ | | | | | | | | 5.0 |
| $TiO_2$ | 2.5 | 3.5 | 1.5 | | | | | 1.0 |
| $ZrO_2$ | 4.0 | 1.5 | 3.7 | | | 3.8 | 9.0 | 3.5 |
| $Nb_2O_5$ | 8.0 | 8.0 | 10.0 | 4.0 | | 4.0 | 7.0 | 4.0 |
| $Ta_2O_5$ | 3.0 | 5.0 | 4.0 | 8.0 | 20.0 | | 2.0 | 3.0 |
| $WO_3$ | 8.0 | 6.0 | 7.2 | | | 8.0 | 3.0 | 0.5 |
| $ZnO$ | 19.0 | 19.0 | 18.0 | 21.0 | 27.9 | 20.0 | 15.0 | 20.0 |
| $Li_2O$ | 1.0 | 1.0 | 1.0 | 1.5 | 2.1 | 1.2 | 2.0 | 1.0 |
| $GeO_2$ | | | | | | | | |
| $Sb_2O_3$ | 0.5 | 0.5 | 0.1 | | | | | |
| $BaO$ | | | | 3.0 | | 4.0 | | |
| Total | 100 | 100 | 100 | 100 | 100 | 100 | 100 | 100 |
| $SiO_2 + B_2O_3$ | 29.0 | 28.0 | 26.7 | 28.5 | 23.0 | 25.0 | 25.5 | 27.0 |
| $n_d$ | 1.804 | 1.812 | 1.815 | 1.777 | 1.793 | 1.805 | 1.814 | 1.801 |
| $v_d$ | 37.0 | 36.6 | 37.0 | 41.4 | 42.5 | 40.2 | 40.4 | 43.3 |
| Tg (° C.) | 568 | 555 | 563 | 547 | 512 | 545 | 540 | 565 |
| At (° C.) | 598 | 594 | 603 | 573 | 533 | 570 | 603 | 604 |
| At—Tg (° C.) | 30 | 39 | 40 | 26 | 21 | 25 | 63 | 39 |
| Result of devitirification test | | | | | | | | |
| 1000° C. | ○ | ○ | ○ | ○ | ○ | ○ | ○ | ○ |
| 950° C. | ○ | ○ | ○ | X | X | Δ | X | X |
| 900° C. | ○ | ○ | ○ | X | X | X | X | X |
| 850° C. | X | X | X | X | X | X | X | X |

TABLE 3

| Composition (mass %) | Example | | | | | | |
|---|---|---|---|---|---|---|---|
| | 13 | 14 | 15 | 16 | 17 | 18 | 19 |
| ① SiO$_2$ | 1 | 3 | 3 | 2 | 7.5 | 6.5 | 6.5 |
| ② B$_2$O$_3$ | 15.5 | 15.5 | 25 | 20 | 22 | 19.19 | 19.54 |
| ③ Y$_2$O$_3$ | 0.1 | 0.2 | 2 | 5 | 1 | | |
| ④ La$_2$O$_3$ | 25.1 | 40 | 30 | 25 | 25 | 33.88 | 35.03 |
| ⑤ TiO$_2$ | | | | | | | |
| ⑥ ZrO$_2$ | 6.5 | 1.5 | 4 | 10 | 3 | 3.7 | 3.7 |
| ⑦ Nb$_2$O$_5$ | 10 | 1 | 4 | 5 | 5 | 6.0 | 6.5 |
| ⑧ Ta$_2$O$_5$ | 1 | 8 | 4 | 7 | 10 | 4.0 | 4.0 |
| ⑨ WO$_3$ | 10 | 5.2 | 4 | 6 | 5 | 7.2 | 5.7 |
| ⑩ ZnO | 28 | 18 | 17 | 17 | 15.5 | 18.49 | 17.99 |
| ⑪ Li$_2$O | 1.8 | 2 | 3 | 2 | 5 | 1.0 | 1.0 |
| ⑫ GeO$_2$ | | 5 | 3.5 | 1 | | | |
| ⑬ Sb$_2$O$_3$ | 1 | 0.6 | 0.5 | | 1 | 0.05 | 0.05 |
| Total | 100 | 100 | 100 | 100 | 100 | 100 | 100 |
| ① + ② | 16.5 | 18.5 | 28 | 22 | 29.5 | 25.69 | 26.04 |
| $n_d$ | 1.842 | 1.817 | 1.775 | 1.82 | 1.775 | 1.805 | 1.805 |
| $v_d$ | 35.4 | 42.1 | 42.4 | 39 | 41.1 | 40.3 | 40.6 |
| Tg (° C.) | 504 | 510 | 521 | 536 | 530 | 558 | 564 |
| At (° C.) | 562 | 552 | 551 | 572 | 584 | 598 | 604 |
| At—Tg (° C.) | 58 | 42 | 30 | 34 | 54 | 40 | 40 |

TABLE 4

| Composition (mass %) | Example | | | | | | |
|---|---|---|---|---|---|---|---|
| | 20 | 21 | 22 | 23 | 24 | 25 | 26 |
| ① SiO$_2$ | 6 | 7 | 4 | 7.5 | 5.5 | 4.5 | 7.5 |
| ② B$_2$O$_3$ | 23 | 21 | 25 | 18 | 21 | 25 | 18 |
| ③ Y$_2$O$_3$ | 2 | 0.5 | 5 | 0.1 | | | |
| ④ La$_2$O$_3$ | 25 | 27 | 25 | 18.1 | 40 | 26.9 | 28.2 |
| ⑤ TiO$_2$ | 2.5 | 3.5 | | 5 | | | 5 |
| ⑥ ZrO$_2$ | 4 | 1.5 | 2 | 4.2 | 2 | 1.5 | 4.2 |
| ⑦ Nb$_2$O$_5$ | 8 | 8 | 15 | 7 | 4 | 15 | 7 |
| ⑧ Ta$_2$O$_5$ | 3 | 5 | 1 | 7 | 3 | 1 | 7 |
| ⑨ WO$_3$ | 8 | 6 | 2 | 6.5 | 5 | 5.1 | 6.5 |
| ⑩ ZnO | 17 | 19 | 19 | 15.5 | 18.9 | 19 | 15.5 |
| ⑪ Li$_2$O | 1 | 1 | 1.5 | 1 | 0.6 | 1.5 | 1 |
| ⑫ GeO$_2$ | | | | | | | |
| ⑬ Sb$_2$O$_3$ | 0.5 | 0.5 | 0.5 | 0.1 | | 0.5 | 0.1 |
| Total | 100 | 100 | 100 | 100 | 100 | 100 | 100 |
| ① + ② | 29 | 28 | 29 | 25.5 | 26.5 | 29.5 | 25.5 |
| $n_d$ | 1.806 | 1.812 | 1.798 | 1.834 | 1.798 | 1.796 | 1.835 |
| $v_d$ | 37.2 | 36.7 | 38.9 | 35.1 | 42.5 | 38 | 35 |
| Tg (° C.) | 564 | 575 | 551 | 576 | 567 | 538 | 568 |

TABLE 4-continued

| Composition | Example | | | | | | |
|---|---|---|---|---|---|---|---|
| (mass %) | 20 | 21 | 22 | 23 | 24 | 25 | 26 |
| At (° C.) | 606 | 614 | 595 | 617 | 612 | 583 | 509 |
| At—Tg (° C.) | 42 | 39 | 44 | 41 | 45 | 45 | 41 |

As shown in Tables 1 to 4, the glasses of the examples all have a refractive index ($n_d$) within a range from 1.75 to 1.85, Abbe number ($v_d$) within a range from 35 to 45, a transition point (Tg) within a range from 500° C. to 580° C., a yield point (At) within a range from 530° C. to 620° C. and At–Tg within a range from 30° C. to 60° C. and, therefore, are suitable for precision mold pressing. Besides, since these glasses have excellent resistance to devitrification, they are suitable for manufacturing a preform used for the precision mold pressing by the dropping method.

In contrast, the glasses of the Comparative Examples A to E which are prior art glasses having a refractive index ($n_d$) within a range from 1.75 to 1.85 and Abbe number ($v_d$) within a range from 35 to 45 have Tg and At within the above described ranges and have At–Tg which is partly within the above described range. In these prior art glasses, however, devitrification was observed by the devitrification test conducted under a condition of 950° C. 2 hours. These glasses of the Comparative Examples, therefore, have an insufficiently narrow range of precision mold pressing temperature with the result that deterioration of the mold is likely to take place and hence are not suitable as glass to be formed by the precision mold pressing.

As described in the foregoing, the optical glass for precision mold pressing according to the invention is a lanthanum borate glass having optical constants of a refractive index ($n_d$) within a range from 1.75 to 1.85 and an Abbe number ($v_d$) within a range from 35 to 45 and having a transition point (Tg) within a range from 500° C. to 580° C. and a yield point (At) within a range from 530° C. to 620° C. with At–Tg being within a range from 30° C. to 60° C. and being free from devitrification in a devitrification test conducted under a condition of 950° C./2 hours and further being free from PbO and $F_2$, ingredients which are not suitable for an optical glass for mold pressing. Thus, the optical glass according to the invention is very suitable for a preform used for the precision mold pressing.

Since the lanthanum borate optical glass of the invention has excellent resistance to devitrification, by using the optical glass of the invention, production of a preform by the dropping method is facilitated and, therefore, a preform which has a shape close to a final product such as an aspherical lens can be produced in a large scale in a stable manner, and the cycle time in the precision mold pressing can be shortened. Further, the temperature range of At–Tg is so wide in the optical glass of the invention that mold pressing is facilitated and deterioration of the mold can be prevented with resulting improvement in yield.

What is claimed is:

1. An optical glass having optical constants of a refractive index ($n_d$) within a range from 1.75 to 1.85 and Abbe number ($v_d$) within a range from 35 to 45 comprising, said optical glass being free of $Yb_2O_3$ and $Y_2O_3$ in mass % on the basis of the oxides:

| | |
|---|---|
| $SiO_2 + B_2O_3$ | 16.5–less than 30% |
| in which $SiO_2$ | 1–7.5% |
| $B_2O_3$ | 15.5–25% |
| $La_2O_3$ | 25–40% |
| $ZrO_2$ | 1.5–10% |
| $Nb_2O_5$ | 1–15% |
| $Ta_2O_5$ | 1–10% |
| $WO_3$ | 1–10% |
| ZnO | 15.5–30% |
| $Li_2O$ | 1.8–5% |
| $Sb_2O_3$ | 0–1% | said optical glass having a transition point (Tg) within a range from 500° C. to 590° C. and a yield point (At) within a range from 530° C. to 630° C., and being free from devitrification in a devitrification test conducted under a condition of 950° C./2 hours.

2. An optical glass having optical constants of a refractive index($n_d$) within a range from 1.75 to 1.85 and an Abbe number ($v_d$), within a range from 35 to 45, said optical glass consisting essentially of, in mass % on the basis of the oxides:

| | |
|---|---|
| $SiO_2 + B_2O_3$ | 16.5–less than 30% |
| in which $SiO_2$ | 1–7.5% |
| $B_2O_3$ | 15.5–25% |
| $La_2O_3$ | 25–40% |
| $ZrO_2$ | 1.5–10% |
| $Nb_2O_5$ | 1–15% |
| $Ta_2O_5$ | 1–10% |
| $WO_3$ | 1–10% |
| ZnO | 15.5–30% |
| $Li_2O$ | 0.6–5% |
| $Sb_2O_3$ | 0–1% | said optical glass having a transition point (Tg) within a range from 500° C. to 590° C. and a yield point (At) within a range from 530° C. to 630° C., and being free from devitrification in a devitrification test conducted under a condition of 950° C./2 hours.

3. An optical glass having optical constants of a refractive index($n_d$) within a range from 1.75 to 1.85 and an Abbe number ($v_d$),Within a range from 35 to 45, said optical glass consisting essentially of, in mass % on the basis of the oxides:

| | |
|---|---|
| $SiO_2 + B_2O_3$ | 16.5–29.5% |
| in which $SiO_2$ | 1–less than 6% |
| $B_2O_3$ | 15.5–25% |
| $La_2O_3$ | 25–40% |
| $ZrO_2$ | 2–6.5% |
| $Nb_2O_5$ | 3–12% |
| $Ta_2O_5$ | 1–80% |
| $WO_3$ | more than 5–10% |

-continued

| | |
|---|---|
| ZnO | 17–28% |
| Li$_2$O | 0.6–3% |
| GeO$_2$ | 0–5% |
| TiO$_2$ | 0–5% |
| Al$_2$O$_3$ | 0–1% |
| BaO | 0–1% |
| Sb$_2$O$_3$ | 0–1%. |

4. An optical glass as defined in claim 3 having a transition point (Tg) within a range from 500° C. to 590° C. and a yield point (At) within a range from 530° C. to 630° C., and being free from devitrification in a devitrification test conducted under a condition of 950° C./2 hours.

5. An optical glass as defined in claim 1 wherein the different in temperature AT–Tg between the yield point and the transition point is 30–60° C.

6. An optical glass as defined in claim 2 wherein the different in temperature AT–Tg between the yield point and the transition point is 30–60° C.

7. An optical glass as defined in claim 3 wherein the different in temperature AT–Tg between the yield point and the transition point is 30–60° C.

8. An optical glass as defined in claim 4 wherein the different in temperature AT–Tg between the yield point and the transition point is 30–60° C.

* * * * *